(12) United States Patent
Zubalsky et al.

(10) Patent No.: US 12,316,905 B2
(45) Date of Patent: *May 27, 2025

(54) SYSTEMS AND METHODS FOR SEAMLESS AUDIO AND VIDEO ENDPOINT TRANSITIONS

(71) Applicant: JBF Interlude 2009 LTD, Tel Aviv (IL)

(72) Inventors: Tal Zubalsky, Brooklyn, NY (US); Jonathan Bloch, Ramat HaSharon (IL); Yuval Hofshy, Kfar Saba (IL); Barak Feldman, Tenafly, NJ (US)

(73) Assignee: JBF Interlude 2009 LTD, Tel Aviv (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/748,244

(22) Filed: Jun. 20, 2024

(65) Prior Publication Data

US 2024/0406496 A1 Dec. 5, 2024

Related U.S. Application Data

(63) Continuation of application No. 16/922,540, filed on Jul. 7, 2020, now Pat. No. 12,047,637.

(51) Int. Cl.
*H04N 21/44* (2011.01)
*G06V 20/40* (2022.01)
*H04N 21/845* (2011.01)

(52) U.S. Cl.
CPC ........... *H04N 21/44* (2013.01); *G06V 20/49* (2022.01); *H04N 21/8456* (2013.01)

(58) Field of Classification Search
None
See application file for complete search history.

(56) References Cited

U.S. PATENT DOCUMENTS

| 4,569,026 A | 2/1986 | Best |
| 5,137,277 A | 8/1992 | Kitaue |

(Continued)

FOREIGN PATENT DOCUMENTS

| CA | 2639491 A1 | 3/2010 |
| DE | 004038801 A1 | 6/1992 |

(Continued)

OTHER PUBLICATIONS

U.S. Appl. No. 12/706,721 now U.S. Pat. No. 9,190,110, filed Feb. 17, 2010, System and Method for Assembling a Recorded Composition.

(Continued)

*Primary Examiner* — Lindsay J Uhl
(74) *Attorney, Agent, or Firm* — Goodwin Procter LLP

(57) ABSTRACT

To provide for seamless audio, video, and contextual transitions in interactive media presentations, endpoints within the presentation are defined. The endpoints are disposed at different times within the presentation and form respective links between points in segments in the presentation. While the presentation is being played, a user interaction is received and an appropriate endpoint is selected based on the interaction. When the selected endpoint is reached, the presentation is seamlessly transitioned to the point in the segment linked to by the endpoint.

20 Claims, 12 Drawing Sheets

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,966,121 A | 10/1999 | Hubbell et al. |
| 5,983,190 A | 11/1999 | Trower et al. |
| 6,067,400 A | 5/2000 | Saeki et al. |
| 6,091,886 A | 7/2000 | Abecassis |
| 6,122,668 A | 9/2000 | Teng et al. |
| 6,128,712 A | 10/2000 | Hunt et al. |
| 6,160,952 A | 12/2000 | Mimura et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,319,780 B2 | 1/2008 | Fedorovskaya et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 | 1/2010 | Hudgeons et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,156,004 B2 | 4/2012 | Wajihuddin |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 | 12/2012 | Bassett et al. |
| 8,350,908 B2 | 1/2013 | Morris et al. |
| 8,405,706 B2 | 3/2013 | Zhang et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,682,739 B1 | 3/2014 | Feinstein |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,313,536 B1 | 4/2016 | Killick |
| 9,363,464 B2 | 6/2016 | Alexander |
| 9,367,196 B1 | 6/2016 | Goldstein et al. |
| 9,374,411 B1 | 6/2016 | Goetz |
| 9,380,326 B1 | 6/2016 | Corley et al. |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,497,496 B1 | 11/2016 | Corley et al. |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 | 12/2016 | Farrell et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,257,578 B1 | 4/2019 | Bloch et al. |
| 10,310,697 B2 | 6/2019 | Roberts et al. |
| 10,419,790 B2 | 9/2019 | Gersten |
| 10,460,765 B2 | 10/2019 | Bloch et al. |
| 10,523,982 B2 | 12/2019 | Oyman |
| 10,531,165 B1 | 1/2020 | Evans |
| 10,715,860 B1 | 7/2020 | Bartlett et al. |
| 10,771,824 B1 | 9/2020 | Haritaoglu et al. |
| 10,856,049 B2 | 12/2020 | Bloch et al. |
| 10,911,837 B1 | 2/2021 | Drury et al. |
| 11,003,748 B2 | 5/2021 | Oliker et al. |
| 11,051,067 B1 | 6/2021 | Baxter et al. |
| 11,301,539 B2 | 4/2022 | Macxis, Jr. et al. |
| 11,432,046 B1 | 8/2022 | Ohliger et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0052891 A1 | 5/2002 | Michaud et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |
| 2002/0124250 A1 | 9/2002 | Proehl et al. |
| 2002/0129374 A1 | 9/2002 | Freeman et al. |

(56) References Cited

U.S. PATENT DOCUMENTS

| | | |
|---|---|---|
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | DeFrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0105888 A1 | 5/2005 | Hamada et al. |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1 | 11/2005 | Ellis et al. |
| 2005/0267948 A1 | 12/2005 | McKinley et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0161954 A1 | 7/2006 | Hamada et al. |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0036875 A1 | 2/2008 | Jones et al. |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0080860 A1 | 3/2009 | Nakano |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0282454 A1 | 11/2009 | Ekstrand |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0031149 A1 | 2/2010 | Gentile et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |
| 2010/0122286 A1 | 5/2010 | Begeja et al. |

(56) References Cited

U.S. PATENT DOCUMENTS

| | | |
|---|---|---|
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | Van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weerasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0026166 A1 | 2/2012 | Takeda et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0073775 A1 | 3/2013 | Wade et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0068648 A1 | 3/2014 | Green et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0109165 A1 | 4/2014 | Friedman |
| 2014/0115114 A1 | 4/2014 | Garmark et al. |

(56) References Cited

U.S. PATENT DOCUMENTS

| | | |
|---|---|---|
| 2014/0125703 A1 | 5/2014 | Roveta et al. |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0161417 A1 | 6/2014 | Kurupacheril et al. |
| 2014/0173650 A1 | 6/2014 | Mathews et al. |
| 2014/0178051 A1 | 6/2014 | Bloch et al. |
| 2014/0186008 A1 | 7/2014 | Eyer |
| 2014/0191948 A1 | 7/2014 | Kim et al. |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0259044 A1 | 9/2014 | Kirby et al. |
| 2014/0259844 A1 | 9/2014 | Kruse |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0357362 A1 | 12/2014 | Cohen |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0086174 A1 | 3/2015 | Abecassis et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1* | 4/2016 | Bloch ............... H04N 21/2365 725/38 |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0032562 A1 | 2/2017 | Block et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0185596 A1 | 6/2017 | Spirer |
| 2017/0195736 A1 | 7/2017 | Chai et al. |
| 2017/0243244 A1 | 8/2017 | Trabelsi et al. |
| 2017/0264920 A1 | 9/2017 | Mickelsen |
| 2017/0280181 A1 | 9/2017 | Ramaley |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2017/0374120 A1* | 12/2017 | Vishnia ............... H04L 65/75 |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0095645 A1 | 4/2018 | Subudhi et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0300852 A1 | 10/2018 | Chen et al. |
| 2018/0300858 A1 | 10/2018 | Chen et al. |
| 2018/0310049 A1 | 10/2018 | Takahashi et al. |
| 2018/0314959 A1 | 11/2018 | Apokatanidis et al. |
| 2018/0376205 A1 | 12/2018 | Oswal et al. |
| 2019/0005716 A1 | 1/2019 | Singh et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0095958 A1 | 3/2019 | Kawabe |
| 2019/0098371 A1 | 3/2019 | Keesan |
| 2019/0104342 A1 | 4/2019 | Catalano et al. |

(56) References Cited

U.S. PATENT DOCUMENTS

| | | | |
|---|---|---|---|
| 2019/0132639 | A1 | 5/2019 | Panchaksharaiah et al. |
| 2019/0139314 | A1 | 5/2019 | Marsh et al. |
| 2019/0166412 | A1 | 5/2019 | Panchaksharaiah et al. |
| 2019/0182525 | A1 | 6/2019 | Steinberg et al. |
| 2019/0238719 | A1 | 8/2019 | Alameh et al. |
| 2019/0238952 | A1 | 8/2019 | Boskovich |
| 2019/0319630 | A1 | 10/2019 | Chen et al. |
| 2019/0335225 | A1 | 10/2019 | Fang et al. |
| 2019/0354936 | A1 | 11/2019 | Deluca et al. |
| 2020/0023157 | A1 | 1/2020 | Lewis et al. |
| 2020/0029128 | A1 | 1/2020 | Erskine |
| 2020/0037047 | A1 | 1/2020 | Cheung et al. |
| 2020/0059699 | A1 | 2/2020 | Malev et al. |
| 2020/0169787 | A1 | 5/2020 | Pearce et al. |
| 2020/0193163 | A1 | 6/2020 | Chang et al. |
| 2020/0344508 | A1 | 10/2020 | Edwards et al. |
| 2021/0263564 | A1 | 8/2021 | Chen et al. |
| 2022/0046291 | A1 | 2/2022 | Jiang et al. |
| 2022/0245209 | A1 | 8/2022 | Cho et al. |

FOREIGN PATENT DOCUMENTS

| | | | |
|---|---|---|---|
| DE | 10053720 | A1 | 4/2002 |
| EP | 0965371 | A2 | 12/1999 |
| EP | 1033157 | A2 | 9/2000 |
| EP | 2104105 | A1 | 9/2009 |
| GB | 2359916 | A | 9/2001 |
| GB | 2428329 | A | 1/2007 |
| JP | 2003-245471 | A | 9/2003 |
| JP | 2008-005288 | A | 1/2008 |
| KR | 2004-0005068 | A | 1/2004 |
| KR | 2010-0037413 | A | 4/2010 |
| WO | WO-1996/013810 | A1 | 5/1996 |
| WO | WO-2000/059224 | A1 | 10/2000 |
| WO | WO-2007/062223 | A2 | 5/2007 |
| WO | WO-2007/138546 | A2 | 12/2007 |
| WO | WO-2008/001350 | A2 | 1/2008 |
| WO | WO-2008/052009 | A2 | 5/2008 |
| WO | WO-2008/057444 | A2 | 5/2008 |
| WO | WO-2009/125404 | A2 | 10/2009 |
| WO | WO-2009/137919 | A1 | 11/2009 |

OTHER PUBLICATIONS

U.S. Appl. No. 14/884,285 now U.S. Pat. No. 11,314,936, filed Oct. 15, 2015, System and Method for Assembling a Recorded Composition.

U.S. Appl. No. 13/033,916 now U.S. Pat No. 9,607,655, filed Feb. 24, 2011, System and Method for Seamless Multimedia Assembly.

U.S. Appl. No. 13/034,645 now U.S. Pat. No. 11,232,458, filed Feb. 24, 2011, System and Method for Data Mining Within Interactive Multimedia.

U.S. Appl. No. 17/551,847, filed Dec. 15, 2021, System and Methods for Data Mining Within Interactive Multimedia.

U.S. Appl. No. 13/437,164 now U.S. Pat. No. 8,600,220, filed Apr. 2, 2012, System and Methods for Loading More Than One Video Content at a Time.

U.S. Appl. No. 14/069,694 now U.S. Pat. No. 9,271,015, filed Nov. 1, 2013, System and Methods for Loading More Than One Video Content at a Time.

U.S. Appl. No. 13/622,780 now U.S. Pat. No. 8,860,882, filed Sep. 19, 2012, System and Methods for Constructing Multimedia Content Modules.

U.S. Appl. No. 13/622,795 now U.S. Pat. No. 9,009,619, filed Sep. 19, 2012, Progress Bar for Branched Videos.

U.S. Appl. No. 14/639,579 now U.S. Pat. No. 10,474,334, filed Mar. 5, 2015, Progress Bar for Branched Videos.

U.S. Appl. No. 13/838,830 now U.S. Pat. No. 9,257,148, filed Mar. 15, 2013, System and Method for Synchronization of Selectably Presentable Media Streams.

U.S. Appl. No. 14/984,821 now U.S. Pat. No. 10,418,066, filed Dec. 30, 2015, System and Method for Synchronization of Selectably Presentable Media Streams.

U.S. Appl. No. 13/921,536 now U.S. Pat. No. 9,832,516, filed Jun. 19, 2013, System and Method for Multiple Device Interaction with Selectably Presentable Media Stream.

U.S. Appl. No. 14/107,600 now U.S. Pat. No. 10,448,119, filed Dec. 16, 2013, Methods and Systems for Unfolding Video Pre-Roll.

U.S. Appl. No. 14/335,381 now U.S. Pat. No. 9,530,454, filed Jul. 18, 2014, Systems and Methods for Real-Time Pixel Switching.

U.S. Appl. No. 14/139,996 now U.S. Pat. No. 9,641,898, filed Dec. 24, 2013, Methods and Systems for In-Video Library.

U.S. Appl. No. 14/140,007 now U.S. Pat. No. 9,520,155, filed Dec. 24, 2013, Methods and Systems For Seeking To Non-Key Frames.

U.S. Appl. No. 14/249,627 now U.S. Pat. No. 9,653,115, filed Apr. 10, 2014, Systems and Methods for Creating Linear Video From Branched Video.

U.S. Appl. No. 15/481,916 now U.S. Pat No. 10,755,747, filed Apr. 7, 2017, Systems and Methods for Creating Linear Video From Branched Video.

U.S. Appl. No. 16/986,977 now U.S. Pat. No. 11,501,802, filed Aug. 6, 2020, Systems and Methods for Creating Linear Video From Branched Video.

U.S. Appl. No. 14/249,665 now U.S. Pat. No. 9,792,026, filed Apr. 10, 2014, Dynamic Timelines For Branched Video.

U.S. Appl. No. 14/509,700 now U.S. Pat. No. 9,792,957, filed Oct. 8, 2014, Systems and Methods for Dynamic Video Bookmarking.

U.S. Appl. No. 14/534,626 now U.S. Pat. No. 10,692,540, filed Sep. 13, 2017, Systems and Methods for Dynamic Video Bookmarking.

U.S. Appl. No. 16/865,896 now U.S. Pat. No. 10,885,944, filed May 4, 2020, Systems and Methods for Dynamic Video Bookmarking.

U.S. Appl. No. 17/138,434 now U.S. Pat. No. 11,348,618, filed Dec. 30, 2020, Systems and Methods for Dynamic Video Bookmarking.

U.S. Appl. No. 17/701,168, filed Mar. 22, 2022, Systems and Methods for Dynamic Video Bookmarking.

U.S. Appl. No. 14/534,626 now U.S. Pat. No. 11,412,276, filed Mar. 31, 2022, Systems and Methods for Parallel Track Transitions.

U.S. Appl. No. 14/700,845 now U.S. Pat. No. 10,582,265, filed Apr. 30, 2015, Systems and Methods for Nonlinear Video Playback Using Linear Real-Time Video Players.

U.S. Appl. No. 16/752,193, filed Jan. 24, 2020, Systems and Methods for Nonlinear Video Playback Using Linear Real-Time Video Players.

U.S. Appl. No. 14/700,862 now U.S. Pat. No. 9,672,868, filed Apr. 30, 2015, Systems and Methods for Seamless Media Creation.

U.S. Appl. No. 14/835,857 now U.S. Pat. No. 10,460,765, filed Aug. 26, 2015, Systems and Methods for Adaptive and Responsive Video.

U.S. Appl. No. 16/559,082 now U.S. Pat. No. 11,804,249, filed Sep. 3, 2019, Systems and Methods for Adaptive and Responsive Video.

U.S. Appl. No. 18/472,352, filed Sep. 22, 2023, Systems and Methods for Adaptive and Responsive Video.

U.S. Appl. No. 14/978,464 now U.S. Pat. No. 11,164,548, filed Dec. 22, 2015, Intelligent Buffering of Large-Scale Video.

U.S. Appl. No. 14/978,491 now U.S. Pat. No. 11,128,853, filed Dec. 22, 2015, Seamless Transitions In Large-Scale Video.

U.S. Appl. No. 17/403,703, filed Aug. 16, 2021, Seamless Transitions In Large-Scale Video.

U.S. Appl. No. 15/085,209 now U.S. Pat. No. 10,462,202, filed Mar. 30, 2016, Media Stream Rate Synchronization.

U.S. Appl. No. 15/165,373, filed May 26, 2016, Symbiotic Interactive Video.

U.S. Appl. No. 15/189,931 now U.S. Pat. No. 10,218,760, filed Jun. 22, 2016, Dynamic Summary Generation for Real-time Switchable Videos.

U.S. Appl. No. 15/395,477 now U.S. Pat. No. 11,050,809, filed Dec. 30, 2016, Systems and Methods for Dynamic Weighting of Branched Video Paths.

U.S. Appl. No. 17/328,261 now U.S. Pat. No. 11,553,024, filed May 24, 2021, Systems and Methods for Dynamic Weighting of Branched Video Paths.

U.S. Appl. No. 15/997,284 now U.S. Pat. No. 11,601,721, filed Jun. 4, 2018, Interactive video dynamic adaption and user profiling.

U.S. Appl. No. 15/863,191 now U.S. Pat. No. 10,257,578, filed Jan. 5, 2018, Dynamic Library Display for Interactive Videos.

(56) References Cited

OTHER PUBLICATIONS

U.S. Appl. No. 16/283,066 now U.S. Pat. No. 10,856,049, filed Feb. 22, 2019, Dynamic Library Display for Interactive Videos.
U.S. Appl. No. 17/091,149 now U.S. Pat. No. 11,528,534, filed Nov. 6, 2020, Dynamic Library Display for Interactive Videos.
U.S. Appl. No. 16/591,103 now U.S. Pat. No. 11,490,047, filed Oct. 2, 2019, Systems And Methods For Dynamically Adjusting Video Aspect Ratios.
U.S. Appl. No. 16/793,205, filed Feb. 18, 2020, Dynamic adaptation of interactive video players using behavioral analytics.
U.S. Appl. No. 16/793,201 now U.S. Pat. No. 11,245,961, filed Feb. 18, 2020, Systems and Methods for Detecting Anomalous Activites for Interactive Videos.
U.S. Appl. No. 16/922,540, filed Jul. 7, 2020, Systems and Methods for Seamless Audio and Video Endpoint Transitions.
U.S. Appl. No. 17/462,199, filed Aug. 31, 2021, Shader-based dynamic video manipulation.
U.S. Appl. No. 17/462,222, filed Aug. 31, 2021, Shader-based dynamic video manipulation.
U.S. Appl. No. 17/334,027, filed May 28, 2021, Automated platform for generating interactive videos.
U.S. Appl. No. 17/484,604, filed Sep. 24, 2021, Discovery engine for interative videos.
U.S. Appl. No. 17/484,635, filed Sep. 24, 2021, Video player integration within websites.
U.S. Appl. No. 18/415,905, filed Jan. 18, 2024, Video player integration within websites.
U.S. Appl. No. 18/331,494, filed Jun. 8, 2023, Automated Production Plan For Product Videos.
U.S. Appl. No. 18/504,390, filed Nov. 8, 2023, Automatic Post-Production for Product Videos.
An ffmpeg and SDL Tutorial, "Tutorial 05: Synching Video," Retrieved from internet on Mar. 15, 2013: <http://dranger.com/ffmpeg/tutorial05.html>, 4 pages.
Archos Gen 5 English User Manual Version 3.0, Jul. 26, 2007, pp. 1-81.
Barlett M, (2008), "iTunes 11: How to Queue Next Song," Technipages, Oct. 6, 2008 issue, pp. 1-8, retrieved on Dec. 26, 2013 from the internet: http://www.technipages.com/itunes-queue-next-song.html.
Bodaghi, A. et al., "Personalization of Interactive Recommender Systems for Expert Users", 4th International Conference on the Web Research (ICWR), (2018), pp. 58-62.
Google Scholar search, "Inserting metadata insertion advertising video", Jul. 16, 2021, 2 pages.
International Preliminary Report and Written Opinion of PCT/IL2012/000080 dated Aug. 27, 2013, 7 pages.
International Search Report and Written Opinion for International Patent Application PCT/IB2013/001000 mailed Jul. 31, 2013 (5 pages).
International Search Report for International Patent Application PCT/IL2010/000362 dated Aug. 25, 2010 (2 pages).
International Search Report for International Patent Application PCT/IL2012/000081 dated Jun. 28, 2012 (4 pages).
International Search Report of PCT/IL2012/000080 dated Aug. 9, 2012, 4 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-6).
Marciel, M. et al., "Understanding the Detection of View Fraud in Video Content Portals", (Feb. 5, 2016), Cornell University, pp. 1-13.
Miller, Gregor et al., "MiniDiver: A Novel Mobile Media Playback Interface for Rich Video Content on an iPhone™", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) mailed Jun. 28, 2012 (7 pages).
Supplemental European Search Report for EP13184145, (Jan. 30, 2014), 5 pages.
Yang, H, et al., "Time Stamp Synchronization in Video Systems," (Oct. 1, 2010) Teletronics Technology Corporation, <http://www.ttcdas.com/products/daus_encoders/pdf/_tech_papers/tp_2010_time_stamp_video_system.pdf>, Abstract, (8 pages).

\* cited by examiner

SYSTEMS AND METHODS FOR SEAMLESS AUDIO AND VIDEO ENDPOINT TRANSITIONS

CROSS-REFERENCE TO RELATED APPLICATIONS

This application is a continuation of U.S. application Ser. No. 16/922,540, filed on Jul. 7, 2020, the entirety of which is incorporated by reference herein.

FIELD OF THE INVENTION

The present disclosure relates generally to audiovisual presentations and, more particularly, to systems and methods for seamless audio and video transitions in interactive media presentations using defined endpoints.

BACKGROUND

The universe of digital streaming media is constantly evolving. Users frequently consume streaming media on their devices through streaming music services, video providers, social networks, and other media providers. Interactive streaming multimedia content, though less common, is also available. Many existing forms of interactive videos allow a viewer to make choices on how to proceed through predefined video paths; however, this functionality is accomplished using separate media content segments that are quickly transitioned to upon selection, resulting in a noticeable disconnect in audio and video between consecutive segments. In other instances, rather than immediately transitioning to a different segment, the user must wait until the end of the currently playing segment in order to allow for a seamless transition. This, however, results in a transition that appears delayed to the user. Techniques are therefore needed to provide transitions among media content segments that occur quickly while maintaining seamlessness in audio, video, and/or context.

SUMMARY

In one aspect, a computer-implemented method for seamless transitions in media presentations comprises the steps of: receiving an interactive video presentation comprising a plurality of video segments; defining a period of time within the interactive video presentation during which a user is permitted to switch from a currently playing video segment in the interactive video presentation to a different video segment in the interactive video presentation; defining a plurality of endpoints at different times within the period of time, wherein each endpoint forms a link between (i) a point in a video segment in the interactive video presentation in which the endpoint is defined and (ii) a point in a different video segment in the interactive video presentation; and during playback of the interactive video presentation: receiving a user interaction during the period of time; determining that the user interaction occurs prior to a first one of the endpoints; continuing playback of the interactive video presentation until reaching the time at which the first endpoint is defined; and upon reaching the time at which the first endpoint is defined, seamlessly transitioning the interactive video presentation from (i) the point in the video segment in the interactive presentation in which the first endpoint is defined to (ii) the point in the different video segment in the interactive video presentation to which the first endpoint is linked. Other aspects of the foregoing include corresponding systems and computer programs on non-transitory storage media.

Other implementations of the foregoing aspects can include one or more of the following features. The interactive video presentation cab be defined by a tree structure, the tree structure comprising a plurality of branches of the interactive video, each branch comprising one or more of the video segments. The different video segments in the interactive video presentation to which the endpoints link can comprise the same video segment. Each endpoint can be associated with an interim video segment that, when played, provides a seamless presentation between the points in the video segments linked to by the endpoint. Seamlessly transitioning the interactive video presentation can comprise presenting the transition video segment immediately upon reaching the time at which the first endpoint is defined and immediately prior to presenting the different video segment to which the first endpoint is linked. Each interim video segment can be ten seconds or fewer. The first endpoint can be a nearest next endpoint within the period of time following occurrence of the user interaction.

In another implementation, the interactive video presentation comprises a plurality of parallel videos that can be switched among while the interactive video presentation is playing, each parallel video comprising one or more of the video segments. In another implementation, the period of time is a first period of time defined within a first one of the parallel videos, and the plurality of endpoints is a first plurality of endpoints defined within the first period of time. A second period of time is defined within a second one of the parallel videos during which a user is permitted to switch from a currently playing video segment in the interactive video presentation to a different video segment in the interactive video presentation, and a second plurality of endpoints is defined at different times within the second period of time, wherein each endpoint in the second plurality of endpoints forms a link between (i) a video segment in the interactive video presentation in which the endpoint is defined and (ii) a different video segment in the interactive video presentation. Seamlessly transitioning the interactive video presentation can comprise switching presentation of the interactive video presentation from the first endpoint in the first parallel video to a second one of the endpoints in the second plurality of endpoints in the second parallel video. The parallel videos can be synchronized to a common timeline, and the second endpoint can be earlier in time on the common timeline than the first endpoint.

In a further implementation the first endpoint forms a link between (i) the point in the video segment in the interactive video presentation in which the first endpoint is defined and (ii) a plurality of different points in one or more different video segments in the interactive video presentation. In addition, seamlessly transitioning the interactive video presentation can include selecting, based on the user interaction, a particular point of the plurality of different points; and seamlessly transitioning the interactive video from (i) the point in the video segment in the interactive presentation in which the first endpoint is defined to (ii) the particular point.

Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described herein are various implementations of methods and supporting systems for seamless transitions, including seamless audio and video transitions, among media content segments using defined endpoints.

Figure 1:
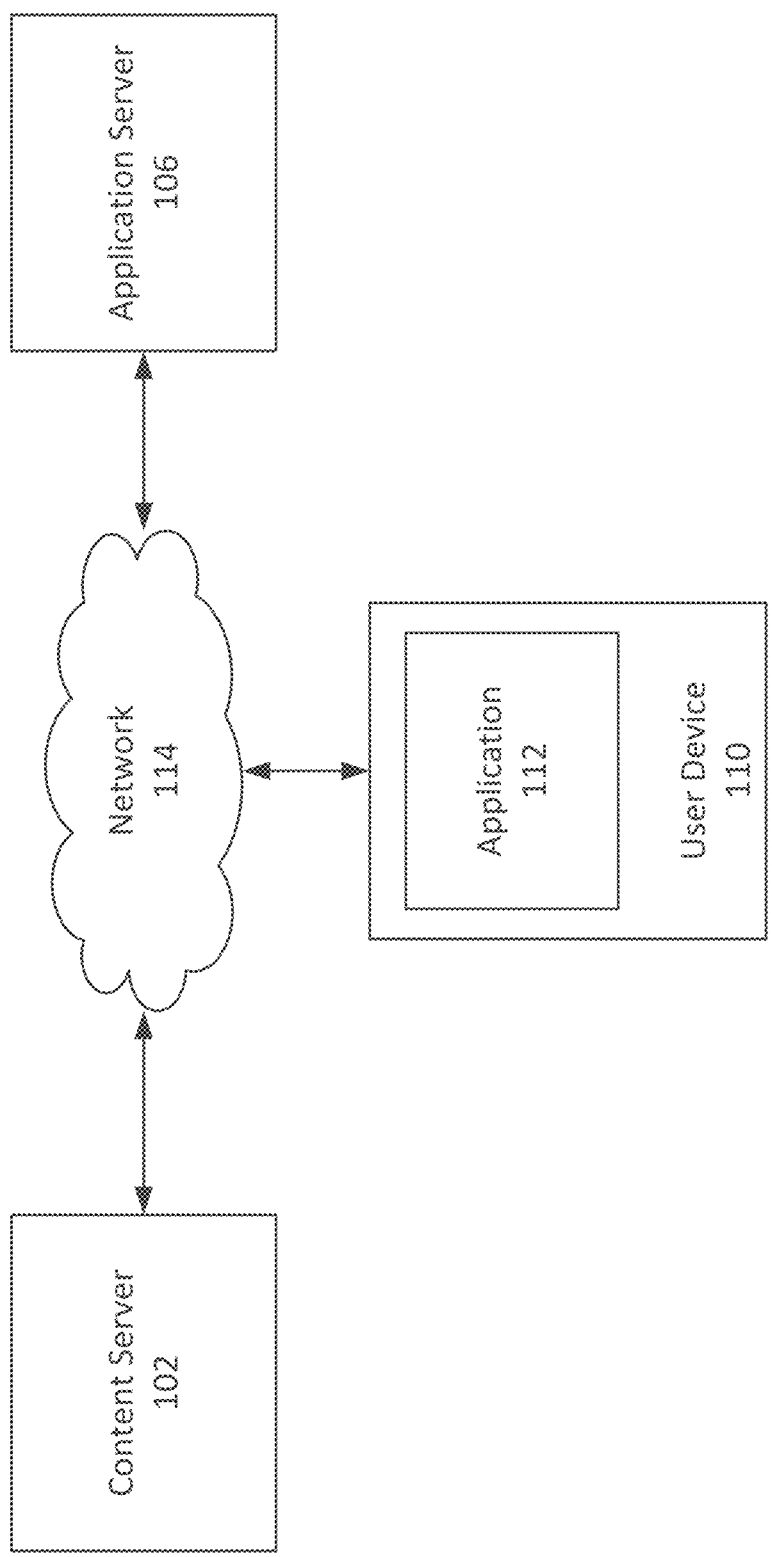
FIG. 1 depicts a high-level architecture of a system for providing interactive video content, according to an implementation.

FIG. 1 depicts an example high-level architecture of a system for providing interactive video content. Application 112 executes on a user device 110 and receives a media presentation, which can include multiple video and/or audio streams. The media presentation can be presented to a user on the user device 110, with application 112 capable of playing and/or editing the content. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, physical buttons, motion detection, remote control, etc.).

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as wireless links (802.11, Bluetooth, GSM, CDMA, etc.), standard telephone lines, LAN or WAN links (e.g., T1, T3, 56 kb, X.25), broadband connections (ISDN, Frame Relay, ATM), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a solid state drive, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The media presentations referred to herein can be structured in various forms. For example, a particular media presentation can be an online streaming video having multiple tracks or streams that a user can interactively switch among in real-time or near real-time. For example, a media presentation can be structured using parallel audio and/or video tracks as described in U.S. Patent Application Pub. No. 2016/0105724, published on Apr. 14, 2016, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously (within milliseconds), such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form or structure. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. Patent Application Pub. No. 2011/0200116, published on Aug. 18, 2011, and entitled "System and Method for Seamless Multimedia Assembly", and U.S. Patent Application Pub. No. 2015/0067723, published on Mar. 5, 2015, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. In some implementations, a decision period can extend over multiple multimedia segments. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles (as further described below), preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple play-throughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which he should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Figure 2:
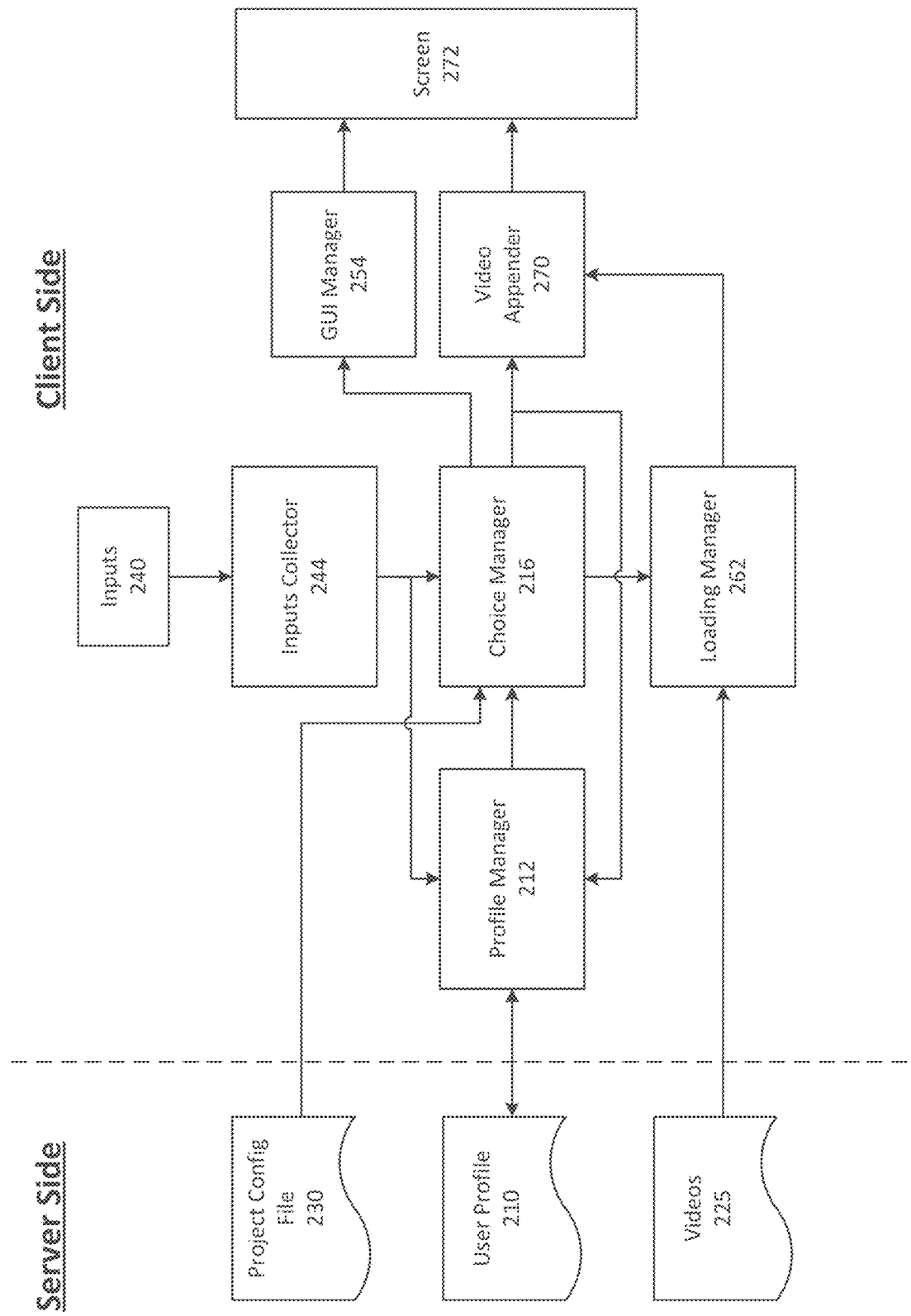
FIG. 2 depicts server-side and client-side components of an application for providing interactive video content, according to an implementation.

FIG. 2 depicts one implementation of a detailed architecture of client-side components in application 112 on user device 110, including inputs received from remote sources, such as content server 102 and application server 106. Client side components include Profile Manager 212, Choice Manager 216, Inputs Collector 244, GUI Manager 254, Loading Manager 262, and Video Appender 270. Profile Manager 212 receives user profile information from User Profile 210, which can exist locally on the client (user device 110) or, as depicted, be obtained externally from a remote server (e.g., content server 102 or application server 106). Profile Manager 212 can also provide information characterizing a user for storing back in User Profile 210. A different User Profile 210 can exist for each identifiable viewer of a media presentation, with each user identified by a unique ID and/or identification technique (e.g., a cookie stored locally on the user's device). Default user profile information can be provided when a viewer is anonymous or cannot otherwise be identified.

User Profile 210 can include information collected through a user's interaction with an interactive video and an interactive media player, as well as information obtained from other sources (e.g., detected location of user's device, information made available through a user's social media account, information provided by the user when creating an account with a provider of the interactive media player, and so on). Profile Manager 212 can use the information in User Profile 210 to cause the presentation of an interactive video to be dynamically modified, e.g., by adapting choices and content presented to the user to the user's previous or current behavior, or otherwise changing the presentation of the interactive video from its default state. For example, based on information in User Profile 210, Profile Manager 212 can direct Choice Manager 216 to select only a subset of choices (e.g., 2 of 3 choices) to provide to a viewer approaching a decision point, where Choice Manager 216 would otherwise provide a full set of choices (e.g., 3 of 3 choices) by default during presentation of the interactive video. Profile Manager 212 can also receive information from Inputs Collector 244 (this information can include, e.g., user interactions) and Choice Manager 216 (this information can include, e.g., a currently selected path in a video tree), which can be used to update User Profile 210. In some implementations, information in User Profile 210 can be used to modify the state of the interactive media player itself, as further described below.

Inputs Collector 244 receives user inputs 240 from input components such as a device display screen 272, keyboard, mouse, microphone, virtual reality headset, and the like. Such inputs 240 can include, for example, mouse clicks, keyboard presses, touchpad presses, eye movement, head movement, voice input, etc. Inputs Collector 244 provides input information based on the inputs 240 to Profile Manager 212 and Choice Manager 216, the latter of which also receives information from Profile Manager 212 as well as a Project Configuration File 230 to determine which video segment should be currently played and which video segments may be played or presented as options to be played at a later time (e.g., influenced by information from the User Profile 210). Choice Manager 216 notifies Video Appender 270 of the video segment to be currently played, and Video Appender 270 seamlessly connects that video segment to the video stream being played in real time. Choice Manager 216 notifies Loading Manager 262 of the video segments that may be played or presented as options to be played at a later time.

Project Configuration File 230 can include information defining the media presentation, such as the video tree or other structure, and how video segments can be linked together in various manners to form one or more paths. Project Configuration File 230 can further specify which audio, video, and/or other media files correspond to each segment (e.g., node in a video tree), that is, which audio, video, and/or other media should be retrieved when application 112 determines that a particular segment should be played. Additionally, Project Configuration File 230 can indicate interface elements that should be displayed or otherwise presented to users, as well as when the elements should be displayed, such that the audio, video, and interactive elements of the media presentation are synchronized. Project Configuration File 230 can be stored on user device 110 or can be remotely accessed by Choice Manager 216.

In some implementations, Project Configuration File 230 is also used in determining which media files should be loaded or buffered prior to being played (or potentially played). Because decision points can occur near the end of a segment, it may be necessary to begin transferring one or more of the potential next segments to viewers prior to a selection being made. For example, if a viewer is approaching a decision point with three possible branches, all three potential next segments can be preloaded partially or fully to ensure a smooth transition upon conclusion of the current segment. Intelligent buffering and progressive downloading of the video, audio, and/or other media content can be performed as described in U.S. Patent Application Pub. No. 2013/0259442, published Oct. 3, 2013, and entitled "Systems and Methods for Loading More Than One Video Content at a Time," the entirety of which is incorporated by reference herein. Similarly, where endpoints (as described below) are used in a branching video presentation, parallel track presentation, or other media presentation, buffering or pre-loading of content associated with one or more endpoint destinations can occur so that seamless transitions can be made between points in the presentation linked by endpoints. For example, if a decision period in a video segment has three defined endpoints that link to three different points in one or more other video segments, the video content associated with all three endpoint destinations can be downloaded and buffered at an appropriate time prior to reaching any of the endpoints.

Using information in Project Configuration File 230, Choice Manager 216 can inform GUI Manager 254 of which interface elements should be displayed to viewers on screen 272. Project Configuration File 230 can further indicate the specific timings for which actions can be taken with respect to the interface elements (e.g., when a particular element is active and can be interacted with). The interface elements can include, for example, playback controls (pause, stop, play, seek, etc.), segment option selectors (e.g., buttons, images, text, animations, video thumbnails, and the like, that a viewer can interact with during decision periods, the selection of which results in a particular multimedia segment being seamlessly played following the conclusion of the current segment), timers (e.g., a clock or other graphical or textual countdown indicating the amount of time remaining to select an option or next segment, which, in some cases, can be the amount of time remaining until the current segment will transition to the next segment), links, popups, an index (e.g., for browsing and/or selecting other multimedia content to view or listen to), and/or a dynamic progress bar such as that described in U.S. Patent Application Pub. No. 2014/0082666, published Mar. 20, 2014, and entitled "Progress Bar for Branched Videos," the entirety of which is incorporated by reference herein. In addition to visual elements, sounds or other sensory elements can be presented. For example, a timer can have a "ticking" sound synchronized with the movement of a clock hand. The interactive interface elements can be shared among multimedia segments or can be unique to one or more of the segments.

In addition to reading information from Project Configuration File 230, Choice Manager 216 is notified of user interactions (e.g., mouse clicks, keyboard presses, touchpad presses, eye movements, etc.) from Inputs Collector 244, which interactions can be translated into actions associated with the playback of a media presentation (e.g., segment selections, playback controls, etc.). Based thereon, Choice Manager 216 notifies Loading Manager 262, which can process the actions as further described below. Choice Manager 216 can also interface with Loading Manager 262 and Video Appender 270. For example, Choice Manager 216 can listen for user interaction information from Inputs Collector 244 and notify Loading Manager 262 when an interaction by the viewer (e.g., a selection of an option displayed during the video) has occurred. In some implementations, based on its analysis of received events, Choice Manager 216 causes the presentation of various forms of sensory output, such as visual, aural, tactile, olfactory, and the like.

As earlier noted, Choice Manager 216 can also notify Loading Manager 262 of video segments that may be played at a later time, and Loading Manger 262 can retrieve the corresponding videos 225 (whether stored locally or on, e.g., content server 102) to have them prepared for potential playback through Video Appender 270. Choice Manager 216 and Loading Manager 262 can function to manage the downloading of hosted streaming media according to a loading logic. In one implementation, Choice Manager 216 receives information defining the media presentation structure from Project Configuration File 230 and, using information from Inputs Collector 244 and Profile Manager 212, determines which media segments to download and/or buffer (e.g., if the segments are remotely stored). For example, if Choice Manager 216 informs Loading Manager 262 that a particular segment A will or is likely to be played at an upcoming point in the presentation timeline, Loading Manager 262 can intelligently request the segment for download, as well as additional media segments X, Y and Z that can be played following segment A, in advance of playback or notification of potential playback thereof. The downloading can occur even if fewer than all of X, Y, Z will be played (e.g., if X, Y and Z are potential segment choices branching off segment A and only one will be selected for playback).

In some implementations, Loading Manager 262 ceases or cancels downloading of content segments or other media if it determines that it is no longer possible for a particular media content segment (or other content) to be presented on a currently traversed media path. Referring to the above example, a user interacts with the video presentation such that segment Y is determined to be the next segment that will be played. The interaction can be received by Choice Manager 216 and, based on its knowledge of the path structure of the video presentation, Loading Manager 262 is notified to stop active downloads or dequeue pending downloads of content segments no longer reachable now that segment Y has been selected.

Video Appender 270 receives media content from Loading Manager 262 and instructions from Choice Manager 216 on which media segments to include in a media presentation. Video Appender 270 can analyze and/or modify raw video or other media content, for example, to concatenate two separate media streams into a single timeline. Video Appender 270 can also insert cue points and other event markers, such as junction events, into media streams. Further, Video Appender 270 can form one or more streams of bytes from multiple video, audio or other media streams, and feed the formed streams to a video playback function such that there is seamless playback of the combined media content on display screen 272 (as well as through speakers for audio, for example).

In some implementations, application 112 tracks information regarding user interactions, users, and/or player devices, and stores the information in a database. Collected analytics can include, but are not limited to: (1) device information, such as number, type, brand, model, device location, operating system, installed software, browser, browser parameters, user agent string, screen size, bandwidth, and network connection parameters; (2) user tracking and demographic data, such as login information, name, address, age, sex, referrer, uniform resource locator (URL), urchin tracking module (UTM) parameters; (3) user or automated action information, such as button/touchpad presses, mouse clicks, mouse/touchpad movements, action timings, media player controls (play, pause, volume up/down, mute, full screen, minimize, seek forward, seek backward, etc.), link outs, shares, rates, comments; (4) information associated with interactions with interactive media content, such as decisions made by users or made automatically (e.g., content segment user choices or default selections), starting a node, ending a node, and content paths followed in the presentation content structure; and (5) information associated with media playback events and timing, such as loading events, buffering events, play and pause events. The analytics can include those described in U.S. Patent Application Pub. No. 2011/0202562, entitled "System and Method for Data Mining within Interactive Multimedia," and published Aug. 18, 2011, the entirety of which is incorporated by reference herein. In one instance, some or all of these analytics are included in or used to inform attributes in User Profile 210.

As earlier described, the transition between multimedia segments in an interactive media presentation can be seamless such that there is no noticeable gap or change in audio, video, and/or context between the segments. For example, with respect to audio, a seamless transition can include voices, music, or other sounds continuing uninterrupted from one segment to the next, or otherwise not having noticeable breaks or interruptions between segments. With respect to video, a seamless transition can include video content continuing uninterrupted from one segment to the next, visually (e.g., the segments, when joined together, appear to be one continuous video) and/or contextually (e.g., the segments depict different scenes in a continuous storyline). Normally, to effect a seamless transition between two segments, the end of one segment (or the end of a decision period) has to join seamlessly to the next segment. When the transition occurs at the end of a decision period, the user experiences a delay between making a decision and seeing the effect of the decision.

Various techniques can be used to address the issue of transition delay and create seamless transitions that feel immediate to the user (e.g., occurring in less than 1 second after the user's decision, or other reasonably imperceptible delay). In one implementation, to create a seamless audio transition between two segments in a media presentation, audio content is muted or faded out during the decision period in the first segment. Once a decision is made during the decision period, the presentation immediately transitions to a different segment corresponding with the decision and audio is resumed (e.g., unmuted or increased in volume). In another implementation, some of the audio in the first segment replaces audio in the next segment. For example, if a user makes a decision with two seconds left in the decision period of the first segment, the presentation can immediately transition to the next segment, but the audio associated with the two seconds remaining in the decision period is then played instead of the two seconds of audio that would normally be played at the beginning of the next segment. It should be appreciated, however, that a shorter period of audio than that remaining in the decision period can be substituted at the beginning of the next segment. To ensure a fully seamless transition, the audio associated with the next segment can be formed to allow for such substitutions without resulting in a noticeable skip or gap in audio.

In one implementation, endpoints are used to provide seamless, near-instant transitions. As used herein, an "endpoint" or "end point" is a defined source point in a media presentation (e.g., a time or location in or relative to a media segment, an event occurrence, or other suitable static or dynamically defined location) that is directionally linked to a different defined destination point in the media presentation. In some implementations, endpoints are defined within a decision period (which can include the beginning or end of a decision period, or any point in between). Notably, an endpoint can represent a connection between two separate points in a media presentation such that, when playing the presentation, a switch immediately from the first point to the second point is seamless. In other implementations, a switch from the first point to the second point can include intermediate transitional content to effect the seamless nature of the switch. Endpoints can be stored as metadata associated with particular nodes and/or specified in a configuration file, such as Project Configuration File 230. The location of each endpoint can be defined as a fixed time within a media content segment or decision period, a relative time (e.g., offset from the beginning of a media content segment, beginning of a decision period, or a previous endpoint), or in some other suitable manner. In further implementations, endpoints are used for analytics. For example, the system can track which endpoints are used to track user decision speed, choice popularity, content segment length (which can be dynamically longer or shorter depending on which endpoint is selected), and so on.

In any event, to fully effect a seamless transition at an endpoint, the audio, video, or other content at the endpoint is designed to flow seamlessly into the audio, video, or other content at the point to where the endpoint links. It is to be appreciated that there are a multitude of ways in which this can be accomplished. The following examples are for purposes of illustration and are not meant to be limiting. As one example, to create a seamless music or sound effects transition between two different points in a media presentation, the audio can include a looping or otherwise repetitive portion that plays at both points. For seamless transitions during dialogue, endpoints can be defined between words or sentences to avoid cutting off in the middle of a spoken word or sound. Other techniques include defining endpoints within quiet or muted audio portions, at scene boundaries, during fades, between camera angle changes, or on creative pauses. Endpoints can be defined manually (e.g., by a content creator) and/or automatically. Automatic creation of endpoints can be performed by editing software at the time of content creation, or dynamically, while the media is being presented. Artificial intelligence or machine learning techniques can be used to identify appropriate seamless transition points, including by intelligently recognizing any of the types of endpoint placements listed above.

Figure 3A:
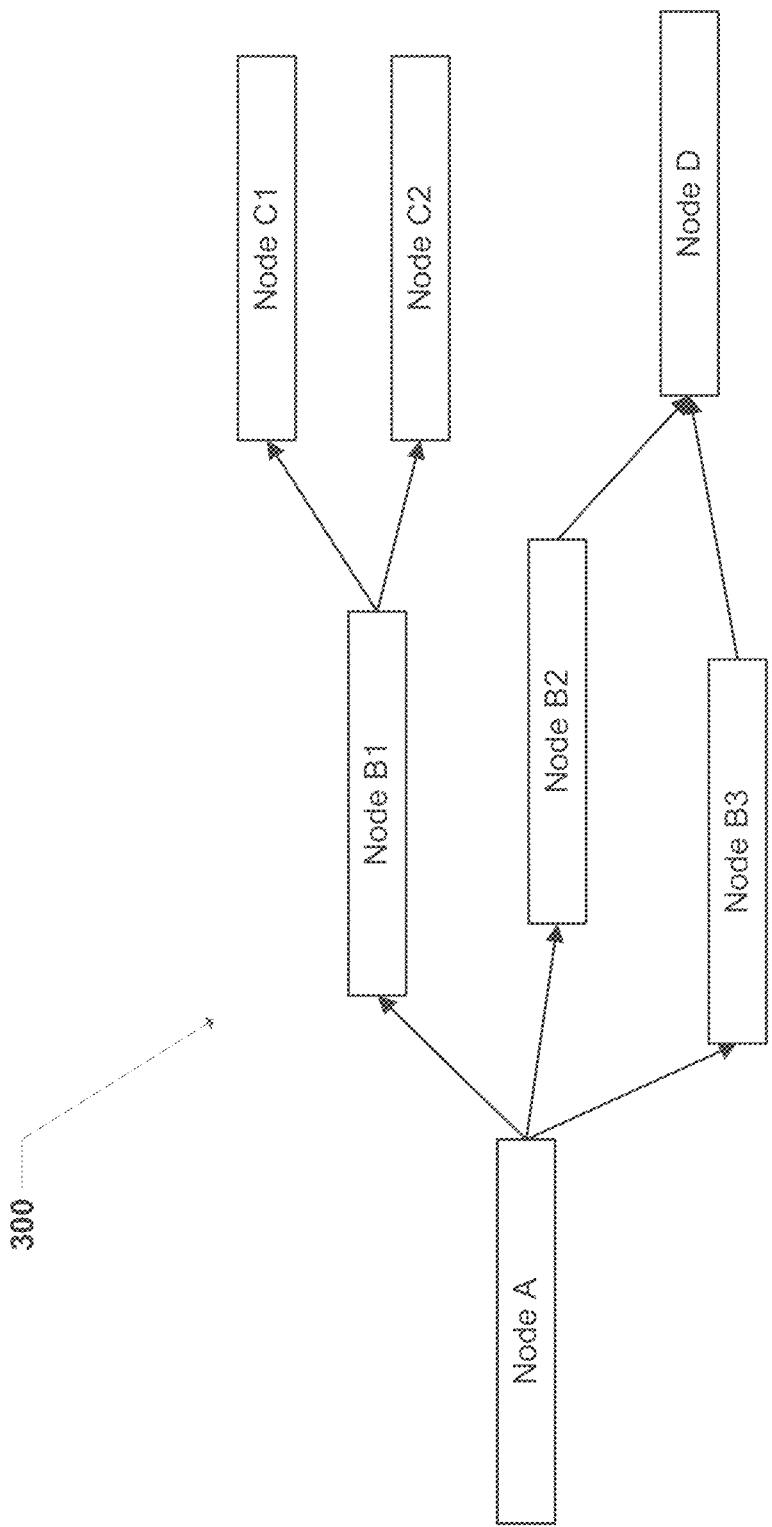
FIG. 3A depicts an example branching media presentation.

FIG. 3A depicts an example branching multimedia presentation 300 with multiple nodes and branching paths. For purposes of simplifying visualization, the presentation 300 includes a small number of nodes and paths; however, it is to be appreciated that significantly more complex presentations are contemplated. The presentation includes seven nodes (A, B1, B2, B3, C1, C2, and D) and four distinct paths (A→B1→C1; A→B1→C2; A→B2→D; and A→B3→D). Node A can include a decision period during which a user can make choices that determine whether the presentation will then proceed from Node A to Node B1, B2, or B3. Similarly, Node B1 can include a decision period the result of which guides the presentation into Node C1 or Node C2.

Figure 3B:
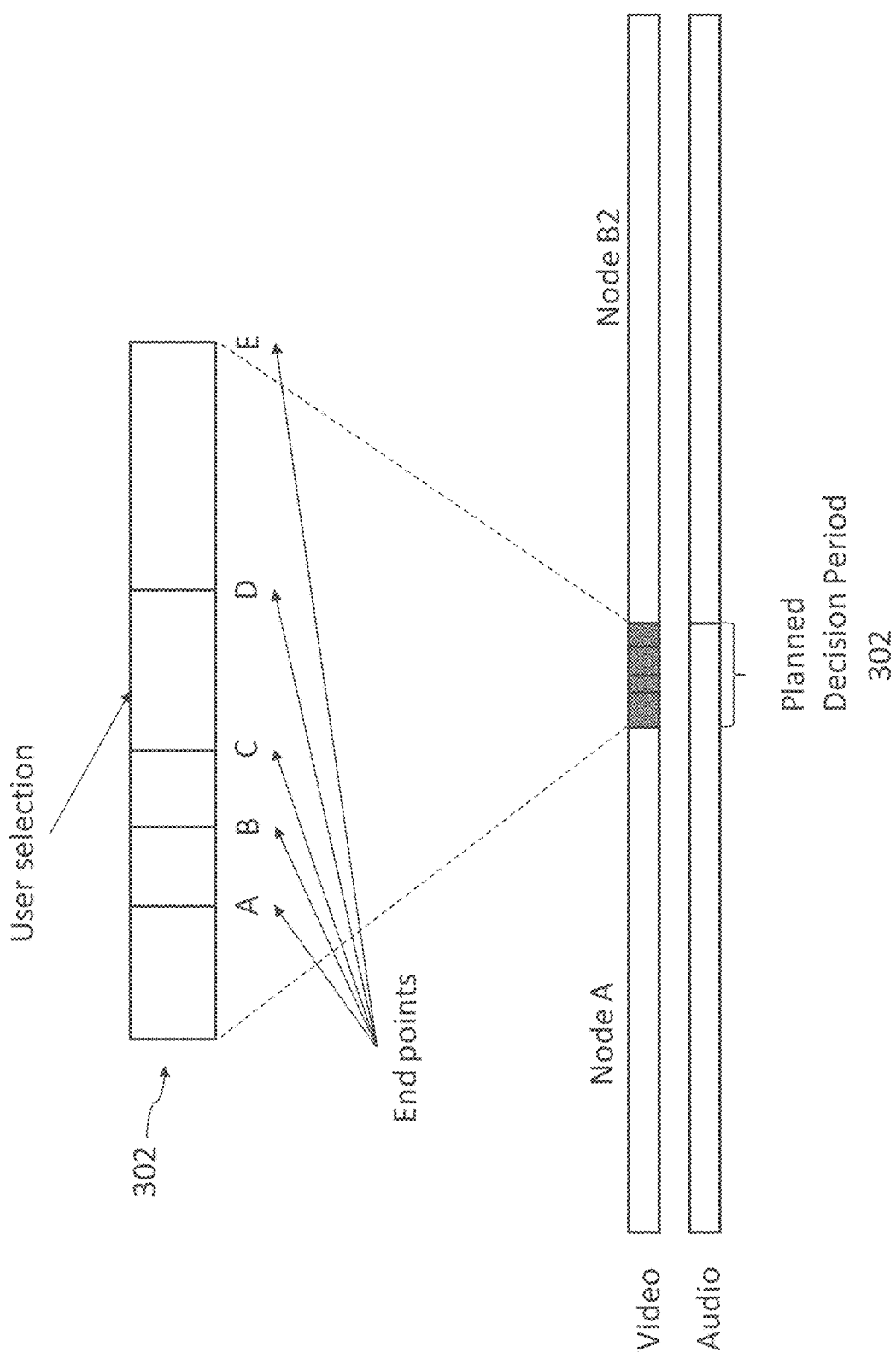
FIG. 3B depicts a portion of the example media presentation of FIG. 3A in which a node has defined endpoints disposed within a decision period.
Figure 3C:
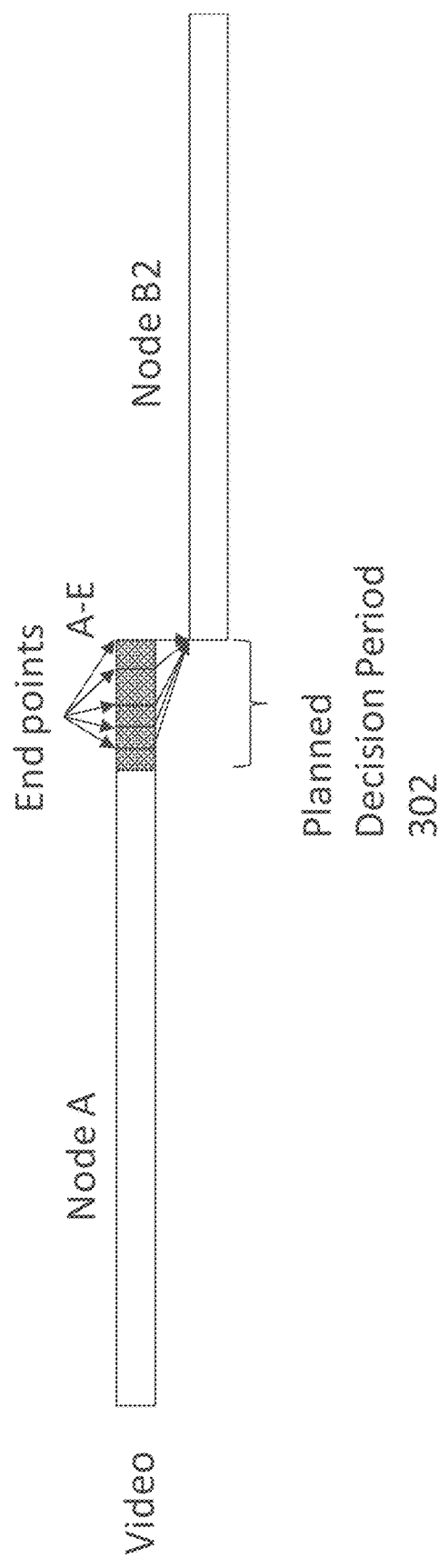
FIGS. 3C-3F depict portions of the example media presentation of FIG. 3A with endpoints joining various points in the presentation.
Figure 3D:
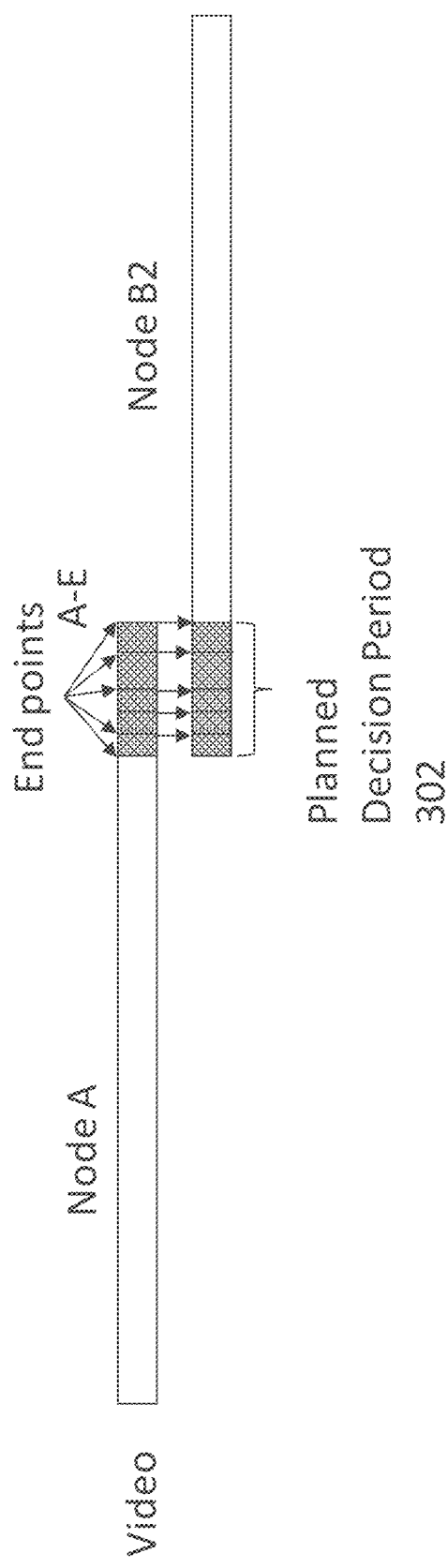

FIG. 3B depicts an example of endpoints defined in a decision period in the multimedia presentation 300 of FIG. 3A. For facilitation of explanation, two nodes (Node A and Node B2) are depicted; however, it is to be appreciated that the techniques described with respect to the connections between Node A and Node B2 can be similarly applied to the connections between Node A and Node B1, as well as Node A and Node B3. Referring again to FIG. 3B, Node A and Node B2 include respective video and audio segments and, in some instances, when played consecutively, the video and audio transition from Node A to Node B2 is seamless. A decision period 302 is defined within the presentation, starting near the end of Node A and continuing to the end of Node A. For example, the decision period 302 can start 10 seconds prior to the end of Node A and finish at the same time that Node A ends. The decision period 302 includes five endpoints A-E, although more or fewer endpoints are possible. Each endpoint A-E occurs at a different point in time within the decision period 302. In some instances, such as depicted in FIG. 3B, the endpoints are not evenly spaced within the decision period 302, whereas, in other instances, some or all of the endpoints are evenly spaced (e.g., every 1 second, every 2 seconds, etc.). Each endpoint A-E is linked to another point in the presentation. Some or all of the endpoints A-E can link to the same point, or some or all of the endpoints A-E can link to different points. For example, FIG. 3C depicts each endpoint A-E linking from the location of the respective endpoint in Node A to the same location (the beginning of Node B2). Alternatively, FIG. 3D depicts each endpoint A-E linking from the location of the respective endpoint in Node A to a different location within Node B2.

A user can make a choice at any time during the decision period 302 (or a non-interactive choice can be made automatically at any time during the decision period 302). However, rather than taking action immediately upon the choice being made, the transition to other content is made upon the playing video reaching the next endpoint in the decision period. This ensures two things: first, if the next endpoint is reasonably close in time to when the choice is made, the transition will occur relatively quickly, and in some instances nearly instantaneously, after the choice (e.g., within 2 seconds, within 1 second, within 500 milliseconds, etc.); and, second, the video and/or audio ending at the decision endpoint and starting at the point in the presentation to which the endpoint links can be formed so that there is a seamless connection when transitioning from one to the other. Referring still to FIG. 3, a user selection occurs in the decision period 302 at a time between endpoints C and D. The presentation continues (i.e., the playing of the video and audio content in Node A continues) until the next endpoint (endpoint D) is reached, at which point the presentation immediately and seamlessly switches to the point linked to by endpoint D. For example, the linked-to point could be defined forward or backward in time, to another audio and/or video segment in the presentation, to another node in a branching tree structure, to another track in a parallel track structure, or any other point within available media content, including a point in another media presentation altogether. In one implementation, the final endpoint E can simply link to the point in Node B2 immediately following the end of the decision period 302 (i.e., the beginning of Node B2), such that the playing content automatically continues without interruption if the end of the decision period, and endpoint E, is reached 302.

In some implementations, endpoints have one-to-many mappings that correspond to different segment options or parallel tracks. To illustrate, referring now to FIG. 3E, as in previous examples, Node A has a decision period that includes endpoints A-E that link from corresponding source points in Node A to destination points in Node B2. Also shown are Node B1 and B3 which are other segment options branching from Node A (see FIG. 3A). Node B1 and Node B3 also have destination points that are respectively linked to from the source points of endpoints A-E. While a user is viewing the presentation, upon reaching the decision period in Node A, the user is presented with various options that, depending on which option(s) is selected, affect the traversal of the tree. As such, based on the user's choice, the presentation can proceed from Node A to any of Nodes B1, B2, or B3. When the transition is made, however, depends on when the user makes their choice in relation to the locations of the endpoints in the decision period. So, for example, if the user makes a choice after endpoint B but before endpoint C, the transition will occur at the source point C0 in Node A defined by endpoint C (endpoint C has a one-to-many mapping of source point C0 to destination points C1/C2/C3). Upon reaching such source point C0, the presentation is seamlessly transitioned from Node A to one of the destination points (C1, C2, or C3) associated with endpoint C. The destination point that is selected is the one that corresponds to the choice made by the user; that is, the corresponding destination point in either Node B1, B2 or B3. Thus, if the presentation proceeds from Node A to Node B3 based on the user's choice, the transition will occur at source point C0 and continue on seamlessly at destination point C3. Likewise, if the presentation instead were to proceed from Node A to Node B1 or Node B2, the transition would occur at source point C0 and continue at destination point C1 or destination point C2, respectively.

Figure 3E:
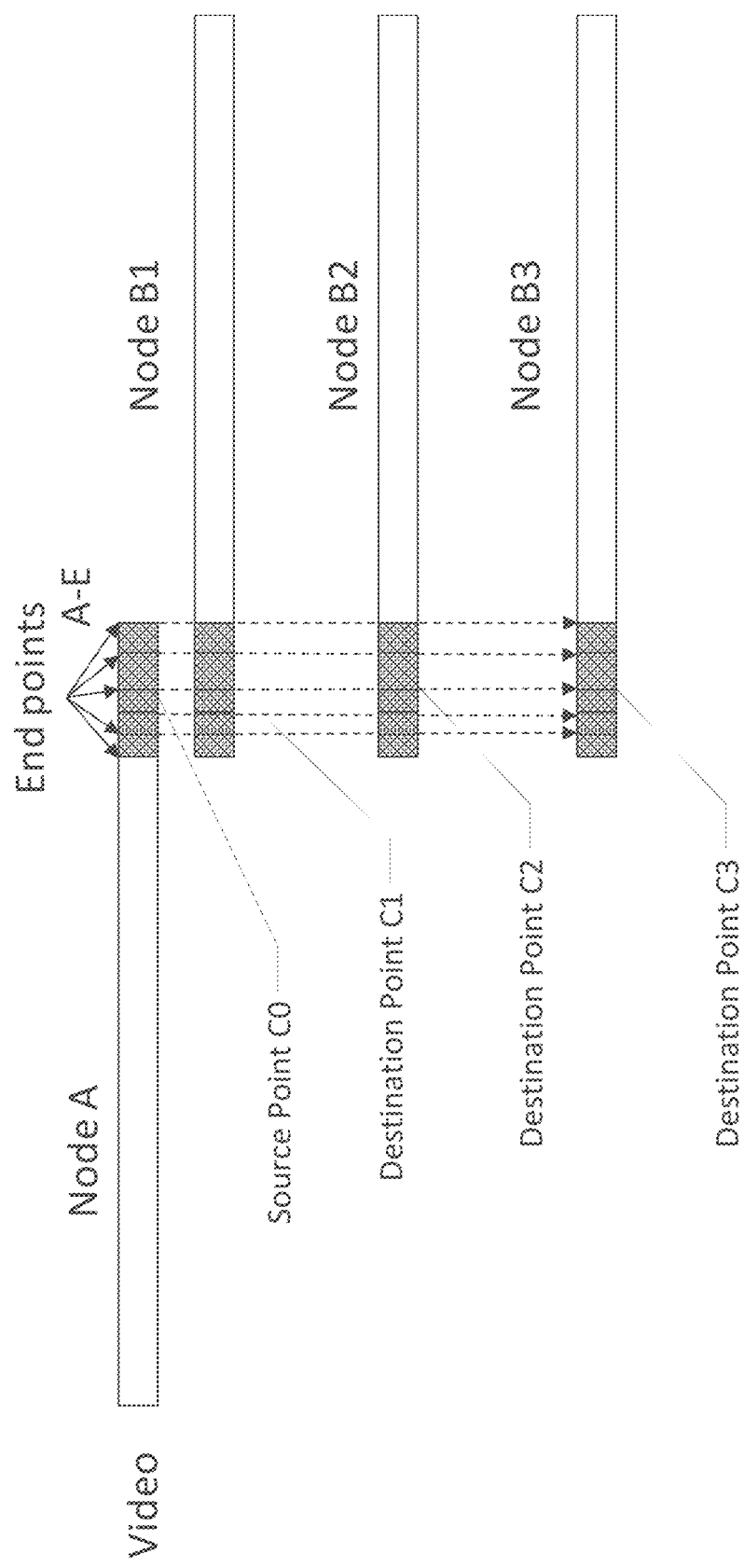
Figure 3F:
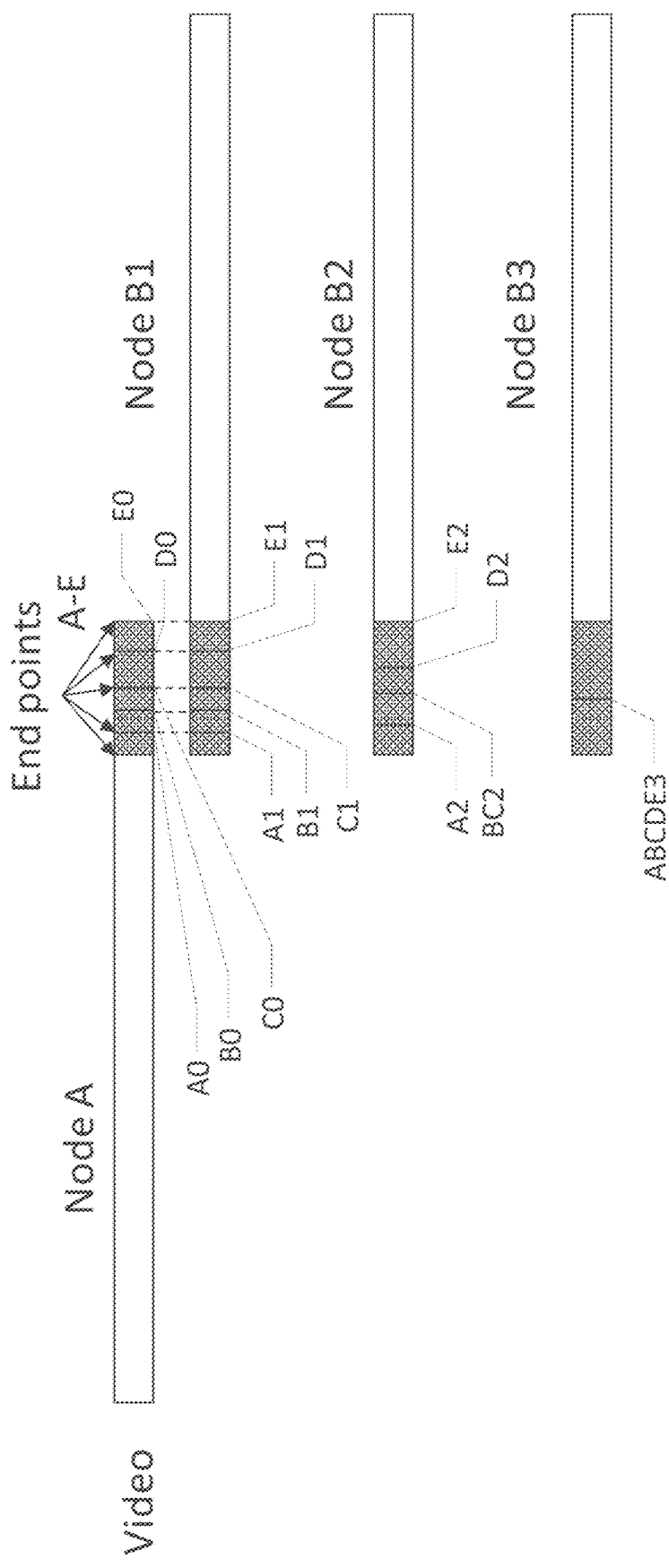

While FIG. 3E shows that Nodes B1, B2, and B3 each have the same number of destination points that are aligned in time with each other (e.g., Nodes B1, B2, and B3 all have a destination point C1, C2, and C3, respectively, at the same point in time with respect to the beginning of the node), this need not be the case. For example, in another implementation, as depicted in FIG. 3F, Nodes B1, B2, and B3 can have different numbers of destination points with different time alignments. In this instance, endpoint A has a one-to-many mapping of source point A0 to destination points A1/A2/ABCDE3; endpoint B has a one-to-many mapping of source point B0 to destination points B1/BC2/ABCDE3; endpoint C has a one-to-many mapping of source point C0 to destination points C1/BC2/ABCDE3; endpoint D has a one-to-many mapping of source point D0 to destination points D1/D2/ABCDE3; and endpoint E has a one-to-many mapping of source point E0 to destination points E1/E2/ABCDE3. All of the aforementioned destination points are located at various times within their respective nodes, but need not correspond among them. For example, in Node B1, destination point A1 is at time 1 with respect to the beginning of Node B1, destination point B1 is at time 2, destination point C1 is at time 3, destination point D1 is at time 5, and destination point E1 is at time 7. In Node B2, destination point A2 is at time 1.5 with respect to the beginning of Node B2, destination point BC2 is at 2.8, destination point D2 is at time 4, and destination point E2 is at time 7. Node B3 contains only one destination point, at time 2.5 from the beginning of Node B3. Accordingly, if the presentation transitions from Node A to Node B1 at source point C0 defined by endpoint C, the presentation will continue seamlessly at destination point C1 (this is similar to the example in FIG. 3A). If the presentation instead transitions from Node A to Node B2 at either source point B0 or C0, seamless continuation occurs at destination point BC2. Further, if the presentation transitions from Node A to Node B3, the presentation will continue at destination point ABCDE3, regardless of at which source point (A0, B0, C0, D0, or E0) the transition occurs.

Figure 4:
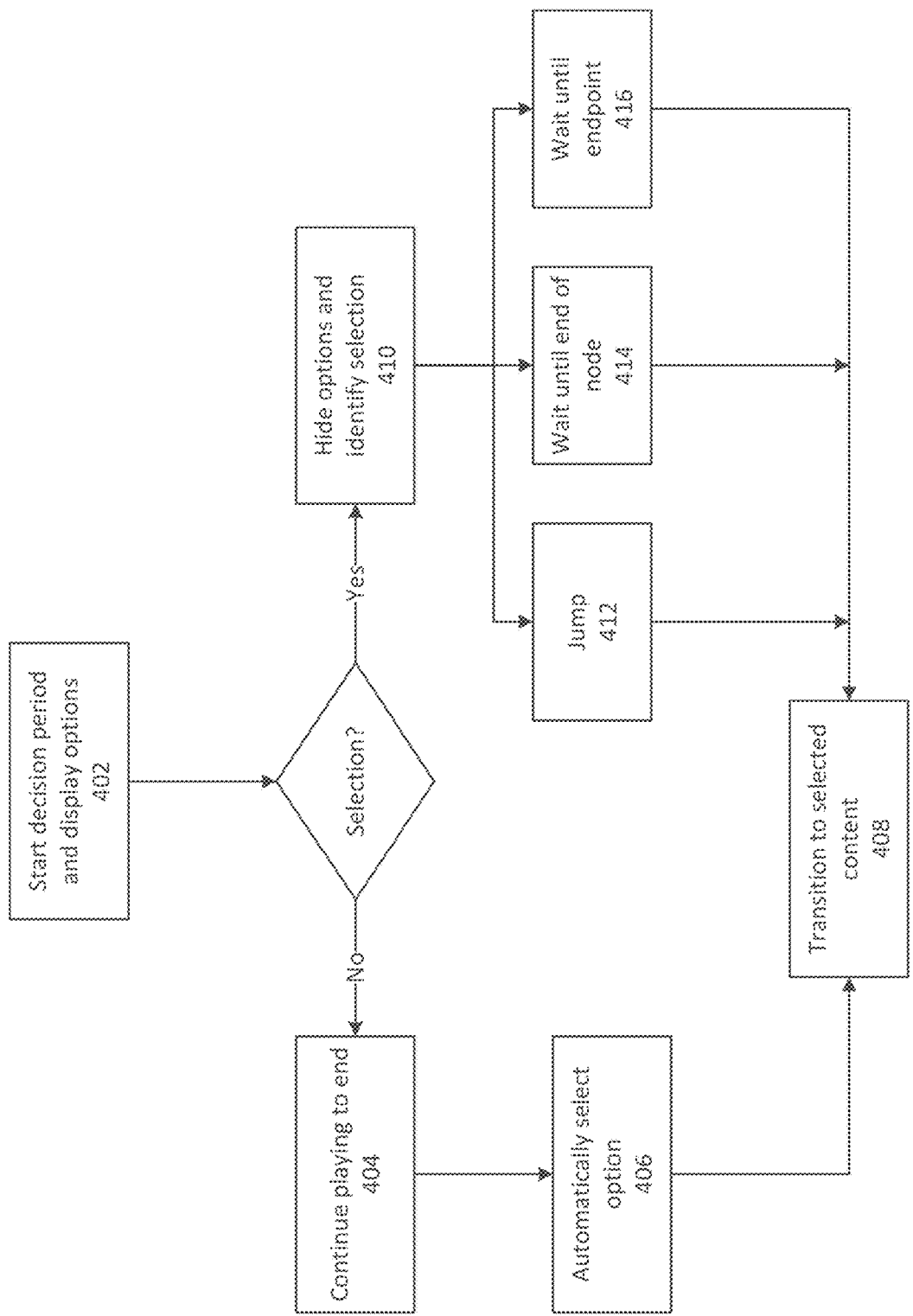
FIG. 4 is a flowchart depicting one implementation of a method for seamless and non-seamless transitions in media presentations.

FIG. 4 illustrates an example method for transitioning (seamlessly or non-seamlessly) among content in a media presentation, in accordance with the various techniques described above. The method commences with Step 402, in which, during the playthrough of the media presentation, a decision period is reached, and various options are presented to the user. As described earlier herein, the options can be represented by interactive buttons or other visual controls. Each option can affect which content is presented to the user after the currently playing content. For example, each option can be associated with a different path in a branching tree structure. If no option is selected by the user before the decision period ends, the content (e.g., video and audio content) continues playing until a cutoff point is reached (Step 404). The cutoff point can be the end of the decision period, the end of the media segment containing the decision period, or some other suitable point in the media presentation. An option is automatically then selected by the system (Step 406), and a transition to the selected content is made (Step 408).

On the other hand, if the user makes a decision and selects an option prior to the end of the decision period, an indicator can be provided to the user to show that the selection was received (e.g., by highlighting a selected button or other user control, changing a color scheme or tone, fading out the selected button or other user control, providing an auditory indicator, providing a vibration or other tactile indicator, etc.) and the other unchosen options can be hidden (Step 410). One of three different techniques is used to transition to the content associated with the selected option. One technique is to jump to the new content immediately (Step 412); however, this may result in a transition that is not seamless in audio, video, and/or other context or content. Alternatively, the transition can occur at the end of the node, segment, decision period, or some other fixed point in the future (Step 414). In this regard, the transition can be ensured seamless, but the user will generally experience a delay for the transition to occur. In Step 416, the transition occurs at an endpoint within the decision period (e.g., the next immediate endpoint following the user's choice, or other following endpoint). In this instance, the transition can occur both seamlessly and substantially instantaneously.

Figure 5:
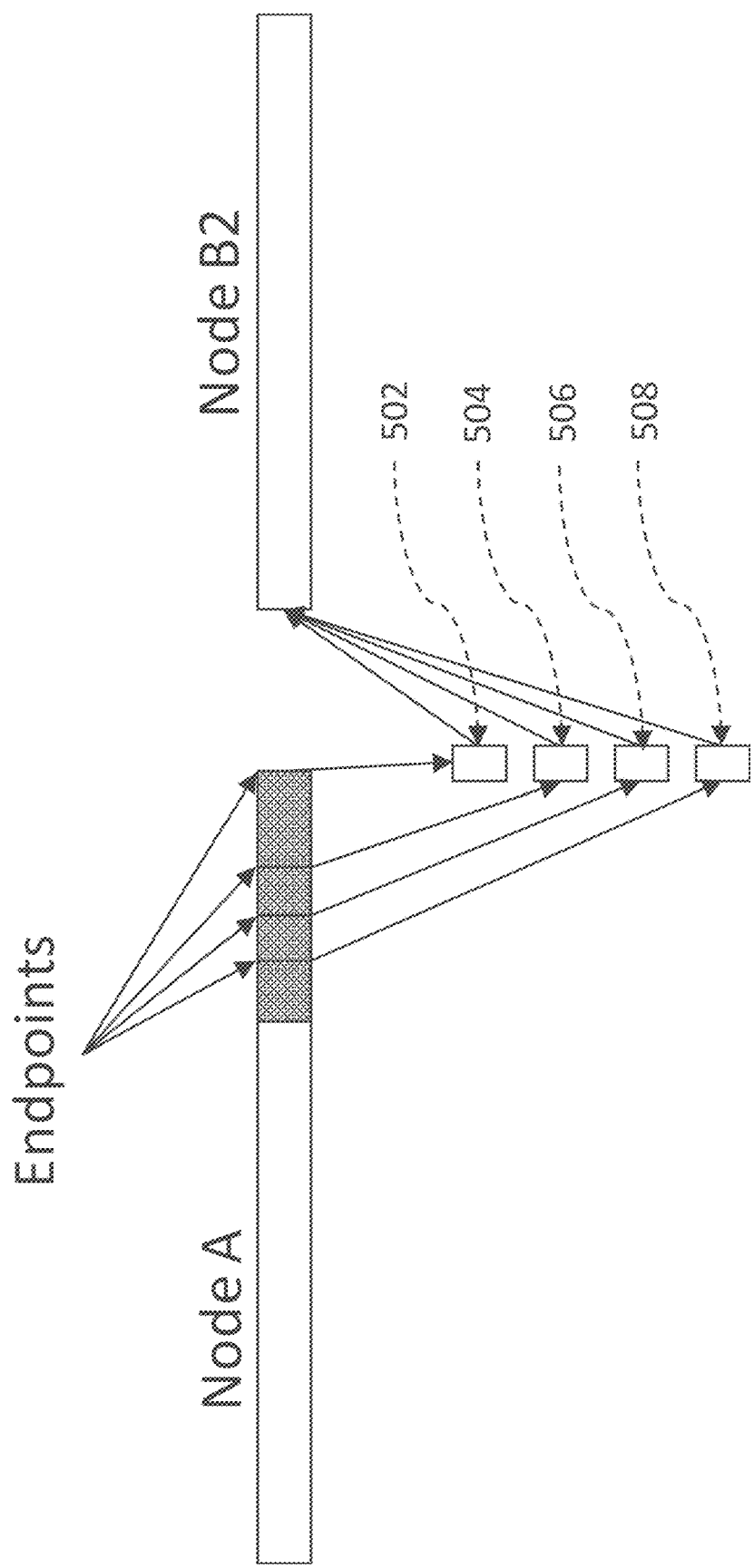
FIG. 5 depicts an example media presentation having intermediate nodes linked to endpoints.

In one implementation, an endpoint can link to an intermediate node that forms a seamless connection between the endpoint and a destination node. FIG. 5 depicts two nodes (Node A and Node B2) in a media presentation, such as a branching interactive video. Node A includes a decision period (shaded area) with four endpoints. Regardless of which endpoint is selected, the presentation proceeds from Node A to the beginning of Node B2. However, because the transitions occur at different times (i.e., the different times of each endpoint within the decision period), intermediate content may be necessary, at least for some of the endpoints, to create a seamless transition between Node A and Node B2. Each of the four intermediate nodes 502, 504, 506, and 508 links to a respective endpoint in Node A and to the destination node, Node B2. Thus, if the user makes a choice during the decision period between the second and third endpoints, the transition from Node A begins at the third endpoint and proceeds through intermediate node 504, before arriving at the beginning of Node B2. Generally, the intermediate nodes 502, 504, 506, and 508 are shorter in time relative to the media content associated with Node A and Node B2 (e.g., 1 second, 2 seconds, 3 seconds, 5 seconds, 10 seconds, or other amount of time necessary to seamlessly transition audio, video, context, etc.). However, the length of the intermediate nodes 502, 504, 506, and 508 is not a limitation, and any suitable length is contemplated.

To illustrate, as one example, the media presentation is an interactive video depicting a passenger in an airplane flying above New York City. As the content in Node A plays, the passenger turns to look out the window and sees notable buildings, bridges and other features enter and leave his view. The decision period is entered, and the user is presented with various options. Once the user makes a selection, the video in Node A proceeds to transition to the beginning of Node B2 at the next closest endpoint. However, the video and audio at Node B2 needs to seamlessly connect to where it leaves off at the endpoint, otherwise, the user will experience a jarring effect as the plane appears to jump ahead over the city, an inflight announcement is cut short, etc. To avoid this, an intermediate node is played between the endpoint and Node B2. The intermediate node contains audio, video, and/or other content that provides a seamless transition between the endpoint and the beginning of Node B2. In some implementations, the intermediate node contains only what is necessary to form a seamless connection (e.g., audio only, video only, audio and video, etc.).

Although FIG. 5 depicts multiple endpoints all indirectly linking to the same destination (i.e., the beginning of Node B2), it should be appreciated that, as elsewhere described herein, endpoints can link to other points in the same or a different presentation. For example, one or more of the endpoints shown in FIG. 5 could alternatively link to nodes other than Node B2. In other implementations, one or more of the endpoints could link to intermediate points within Node B2, rather than the beginning of the node. In another implementation, one or more of the endpoints could link directly to a destination node, without an intermediate node. For example, the last endpoint could link directly to the beginning of Node B2 if no intermediate content is necessary to create a seamless connection between the end of Node A and the beginning of Node B2. In further implementations, endpoints can link to intermediate points within a node, instead of or in addition to the use of intermediate nodes.

In another implementation, endpoints are used to facilitate seamless transitions among parallel tracks or nodes. Typically, with parallel tracks, the user can switch among the tracks in substantially real-time. The track that the user has selected is presented to the user, while the other tracks continue playing either with reduced focus or completely invisible to the user. Similarly to television channels, the content on one track does not pause if the user switches to view content on another track. However, an instant switch from one track to another can result in a transition that is not seamless.

Figure 6:
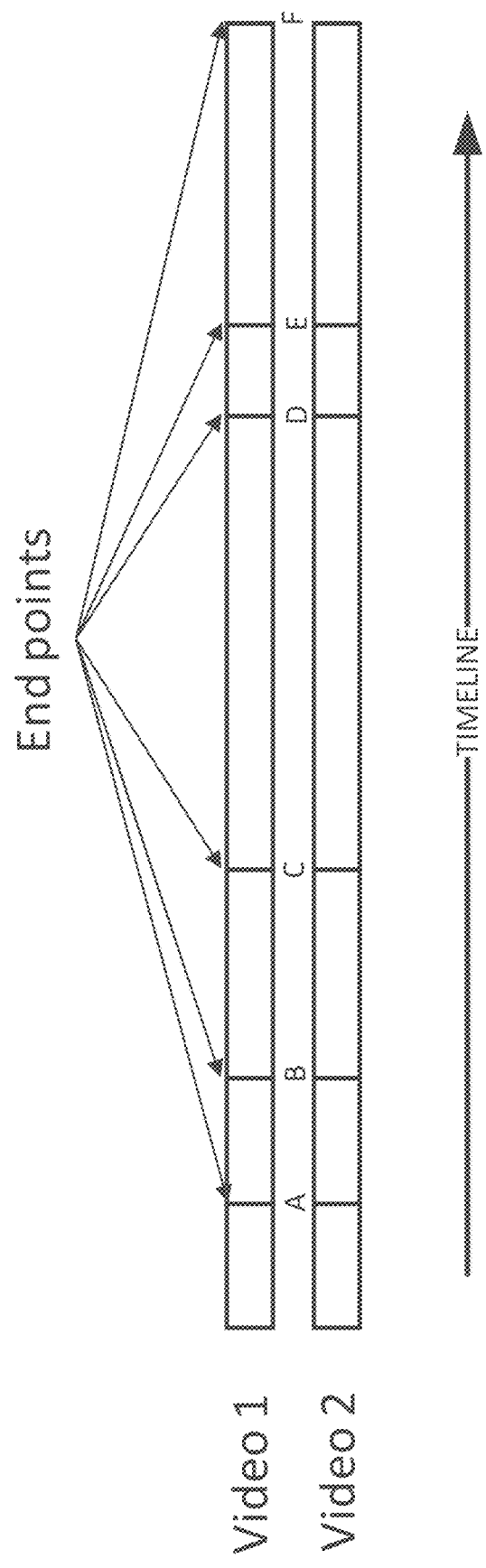
FIG. 6 depicts an example of temporally aligned endpoints in parallel video content.

Referring to FIG. 6, in the context of two or more parallel tracks, endpoints can be defined so that switching tracks is seamless. Thus, if a user is viewing track Video 1 and interacts with the video in a manner that requires a transition to track Video 2, the transition will not occur until the next endpoint is reached. For example, if the user interaction occurs between endpoints B and C, track Video 1 will not switch to track Video 2 until endpoint C in track Video 1. Once the switch occurs, the presentation continues at the corresponding endpoint (endpoint C) in track Video 2. Naturally, tracks Video 1 and Video 2 will have been designed so that the corresponding endpoints in each allow for seamless transitions back and forth between the tracks. For example, corresponding endpoints in different tracks can be scene boundaries, fades, camera changes, mutes, volume changes, or other alignments in visual content, audio content, context, etc., that provide for seamless transitions from one track endpoint to another track corresponding endpoint.

Figure 7:
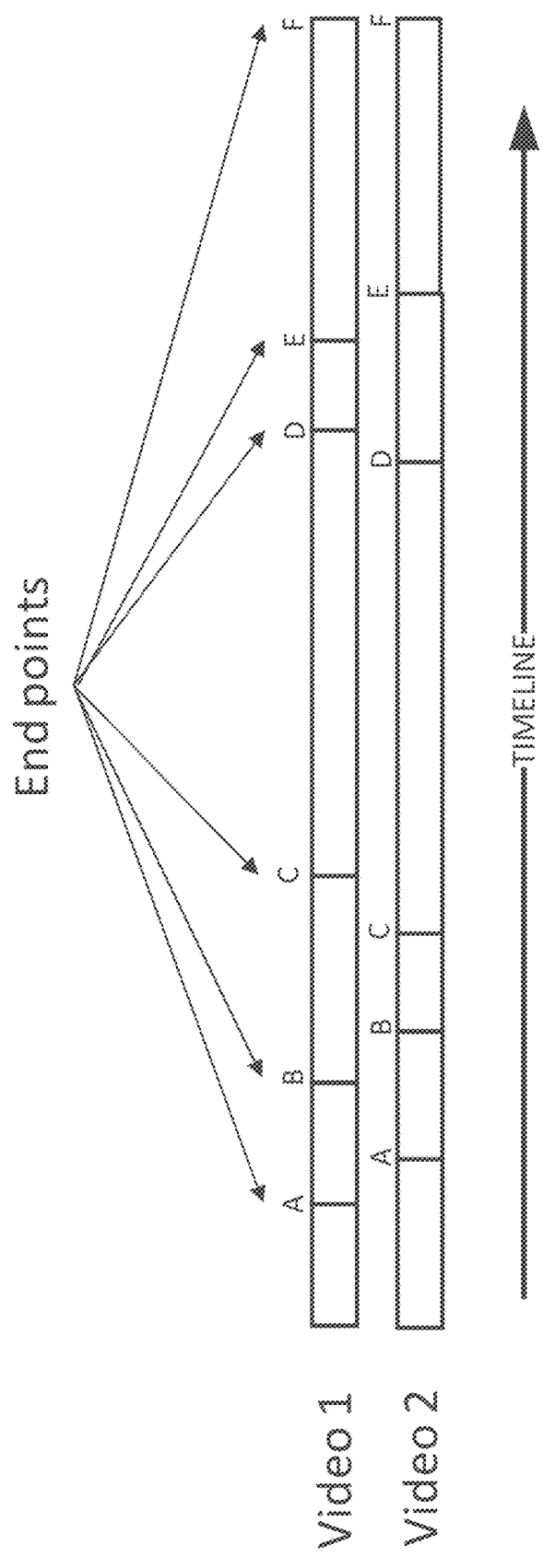
FIG. 7 depicts an example of non-temporally aligned endpoints in parallel video content.

In another implementation, parallel tracks are not temporally aligned, such that corresponding endpoints do not need to be defined at the same time in each track (as is shown in FIG. 6). Instead, as depicted in FIG. 7, endpoints in one track can be defined at times different from their corresponding endpoints in other tracks. Each of track Video 1 and track Video 2 has six defined endpoints (A, B, C, D, E and F). However, a transition from endpoint A in track Video 1 to corresponding endpoint A in track Video 2 results in a jump forward in time. Likewise, a transition from endpoint D in track Video 1 to corresponding endpoint D in track Video 2 is a jump backward in time. In some implementations, endpoints need not be defined in the same order in each track. So, for example, still referring to FIG. 7, endpoints A and D in track Video 2 could be switched. Accordingly, when a transition occurs at endpoint A in track Video 1, the presentation jumps ahead past endpoints B and C in track Video 2, all the way to endpoint A (formerly endpoint D). Similarly, a transition from endpoint D in track Video 1 goes backward in time, again past endpoints B and C in track Video 2, to the first endpoint D (formerly endpoint A). In further implementations, multiple endpoints in a track can link to a single corresponding endpoint in a different track. Further still, one endpoint in a track can link to multiple endpoints in another track (and any suitable mechanism can be used to select which destination endpoint will be transitioned to, e.g., random selection, selection based on user profile, statistics, other user choices, etc.). One will appreciate the various configurations that endpoints can take over multiple parallel tracks.

Although the systems and methods described herein relate primarily to audio and video playback, the invention is equally applicable to various streaming and non-streaming media, including animation, video games, interactive media, and other forms of content usable in conjunction with the present systems and methods. Further, there can be more than one audio, video, and/or other media content stream played in synchronization with other streams. Streaming media can include, for example, multimedia content that is continuously presented to a user while it is received from a content delivery source, such as a remote video server. If a source media file is in a format that cannot be streamed and/or does not allow for seamless connections between segments, the media file can be transcoded or converted into a format supporting streaming and/or seamless transitions. Alternatively or in addition, audio, video and other media can be stored as files in individual or combined form, and can be stored locally on a user's device or remotely on a server that transmits or streams the files to the user device.

While various implementations of the present invention have been described herein, it should be understood that they have been presented by example only. For example, one of skill in the art will appreciate that the techniques for creating seamless audio segments can be applied to creating seamless video segments and other forms of seamless media as well. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

The invention claimed is:

1. A computer-implemented method for seamless transitions in media presentations, the method comprising:
 receiving an interactive video presentation comprising a plurality of parallel videos;
 defining a plurality of endpoints within a first video of the plurality of parallel videos, wherein each endpoint forms a plurality of links between (i) a point in the first video at which the endpoint is defined and (ii) a plurality of different points in one or more different videos of the plurality of parallel videos; and
 during playback of the interactive video presentation:
  presenting the first video to a user;
  displaying a plurality of options to the user;
  receiving a user selection of an option from the plurality of options;
  identifying a next endpoint to occur following the user selection, the identified endpoint being defined at a time prior to an end of the first video;
  continuing presentation of the first video until reaching the time at which the identified endpoint is defined;
  selecting, based on the option selected by the user, a particular point of the plurality of different points linked to the identified endpoint; and
  upon reaching the time at which the identified endpoint is defined, seamlessly transitioning the interactive video presentation from (i) the point in the first video at which the identified endpoint is defined to (ii) the particular point in the different video of the plurality of parallel videos to which the identified endpoint is linked.

2. The method of claim 1, wherein each parallel video of the plurality of parallel videos includes one or more video segments.

3. The method of claim 1, wherein the plurality of parallel videos are synchronized to a common timeline.

4. The method of claim 3, wherein the particular point to which the identified endpoint is linked is later in time on the common timeline than the identified endpoint.

5. The method of claim 3, wherein the particular point to which the identified endpoint is linked is earlier in time on the common timeline than the identified endpoint.

6. The method of claim 3, wherein the particular point to which the identified endpoint is linked is aligned in time on the common timeline with the identified endpoint.

7. The method of claim 1, wherein at least two endpoints of the plurality of endpoints are linked to a common point in a second video of the plurality of parallel videos.

8. The method of claim 1, wherein the plurality of endpoints are defined within the first video at scene boundaries, fades, camera changes, mutes, volume changes, or any combination thereof.

9. The method of claim 1, further comprising:
defining a second plurality of endpoints within a second video of the plurality of parallel videos, wherein each endpoint forms a plurality of links between (i) a point in the second video at which the endpoint is defined and (ii) a plurality of different points in one or more different videos of the plurality of parallel videos.

10. The method of claim 9, wherein seamlessly transitioning the interactive video presentation comprises switching presentation of the interactive video presentation from the identified endpoint in the first video to a particular endpoint in the second plurality of endpoints within the second video.

11. A system for seamless transitions in media presentations, the system comprising:
at least one memory for storing computer-executable instructions; and
at least one processor for executing the instructions stored on the memory, wherein execution of the instructions programs the at least one processor to perform operations comprising:
receiving an interactive video presentation comprising a plurality of parallel videos;
defining a plurality of endpoints within a first video of the plurality of parallel videos, wherein each endpoint forms a plurality of links between (i) a point in the first video at which the endpoint is defined and (ii) a plurality of different points in one or more different videos of the plurality of parallel videos; and
during playback of the interactive video presentation:
presenting the first video to a user;
displaying a plurality of options to the user;
receiving a user selection of an option from the plurality of options;
identifying a next endpoint to occur following the user selection, the identified endpoint being defined at a time prior to an end of the first video;
continuing presentation of the first video until reaching the time at which the identified endpoint is defined;
selecting, based on the option selected by the user, a particular point of the plurality of different points linked to the identified endpoint; and
upon reaching the time at which the identified endpoint is defined, seamlessly transitioning the interactive video presentation from (i) the point in the first video at which the identified endpoint is defined to (ii) the particular point in the different video of the plurality of parallel videos to which the identified endpoint is linked.

12. The system of claim 11, wherein each parallel video of the plurality of parallel videos includes one or more video segments.

13. The system of claim 11, wherein the plurality of parallel videos are synchronized to a common timeline.

14. The system of claim 13, wherein the particular point to which the identified endpoint is linked is later in time on the common timeline than the identified endpoint.

15. The system of claim 13, wherein the particular point to which the identified endpoint is linked is earlier in time on the common timeline than the identified endpoint.

16. The system of claim 13, wherein the particular point to which the identified endpoint is linked is aligned in time on the common timeline with the identified endpoint.

17. The system of claim 11, wherein at least two endpoints of the plurality of endpoints are linked to a common point in a second video of the plurality of parallel videos.

18. The system of claim 11, wherein the plurality of endpoints are defined within the first video at scene boundaries, fades, camera changes, mutes, volume changes, or any combination thereof.

19. The system of claim 11, wherein execution of the instructions programs the at least one processor to perform operations further comprising:
defining a second plurality of endpoints within a second video of the plurality of parallel videos, wherein each endpoint forms a plurality of links between (i) a point in the second video at which the endpoint is defined and (ii) a plurality of different points in one or more different videos of the plurality of parallel videos.

20. The system of claim 19, wherein seamlessly transitioning the interactive video presentation comprises switching presentation of the interactive video presentation from the identified endpoint in the first video to a particular endpoint in the second plurality of endpoints within the second video.

* * * * *